United States Patent
Pischtschan et al.

(10) Patent No.: US 6,211,269 B1
(45) Date of Patent: Apr. 3, 2001

(54) GLASS-FIBER-REINFORCED THERMOPLASTIC ABS COMPOSITIONS

(75) Inventors: Alfred Pischtschan, Kürten; Herbert Eichenauer, Dormagen; Horst Peters, Leverkusen, all of (DE)

(73) Assignee: Bayer AG, Leverkusen (DE)

( * ) Notice: Subject to any disclaimer, the term of this patent is extended or adjusted under 35 U.S.C. 154(b) by 0 days.

(21) Appl. No.: 09/178,037

(22) Filed: Oct. 23, 1998

Related U.S. Application Data

(63) Continuation-in-part of application No. 08/771,374, filed on Dec. 16, 1996, now abandoned, which is a continuation of application No. 07/918,970, filed on Jul. 24, 1992, now abandoned.

(30) Foreign Application Priority Data

Aug. 8, 1991 (DE) .................................... 41 26 242

(51) Int. Cl.$^7$ .................................... C08K 5/57
(52) U.S. Cl. .................... 524/178; 524/182; 524/494
(58) Field of Search .................... 524/178, 182, 524/494, 575

(56) References Cited

U.S. PATENT DOCUMENTS

| | | | |
|---|---|---|---|
| 2,789,107 | 4/1957 | Weinberg et al. | 524/178 |
| 3,154,529 * | 10/1964 | Kobayashi et al. | 524/178 |
| 3,644,271 | 2/1972 | Tulley | 524/494 |
| 3,644,589 * | 2/1972 | Moore et al. | 524/178 |
| 3,907,932 | 9/1975 | Kennedy et al. | 260/881 |
| 3,951,906 | 4/1976 | Farber et al. | 524/494 |
| 4,085,077 | 4/1978 | Dworkin et al. | 260/23 |
| 4,089,912 * | 5/1978 | Levek et al. | 524/178 |
| 4,298,702 * | 11/1981 | Hahn et al. | 524/178 |
| 4,419,471 | 12/1983 | Nelson et al. | 525/902 |
| 4,506,049 * | 3/1985 | Mueller | 524/178 |
| 4,585,824 | 4/1986 | Uchida et al. | 524/494 |
| 4,609,701 * | 9/1986 | Jones et al. | 524/178 |
| 4,622,351 | 11/1986 | Van | 524/494 |
| 4,853,445 * | 8/1989 | Meyer et al. | 524/178 |
| 5,049,614 | 9/1991 | Biglione | 525/85 |

FOREIGN PATENT DOCUMENTS

| | | |
|---|---|---|
| 6 058 086 | 1/1987 | (AU) . |
| 3 436 602 | 10/1986 | (DE) . |
| 0 216 065 | 7/1986 | (EP) . |
| 0 303 919 | 8/1988 | (EP) . |
| 50-77452 * | 6/1975 | (JP) . |
| 52-25848 * | 2/1977 | (JP) . |
| 56 095 953 | 8/1981 | (JP) . |
| 59-184246 * | 10/1984 | (JP) . |
| 60-195152 * | 10/1985 | (JP) . |
| 62-7751 * | 1/1987 | (JP) . |
| 1-201351 * | 8/1989 | (JP) . |

OTHER PUBLICATIONS

Styrene, Its Polymers, Copolymers and Derivatives—1222–1228, ed. Ray Boundy and Raymond F. Boyer 1952.
Chen et al., (Chen) Journal of Applied Polymer Science, vol. 28, pp. 391–406 (1983).
Abstract (from Orbit) for JP 56 095 953 (1981).

* cited by examiner

Primary Examiner—Veronica P. Hoke
(74) Attorney, Agent, or Firm—Connolly Bove Lodge & Hutz LLP

(57) ABSTRACT

Glass-fiber-reinforced ABS molding compounds containing up to 5% by weight of a tin-containing organic compound corresponding to formula (I) and/or (II)

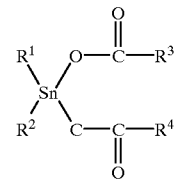

(I)

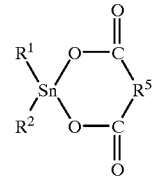

(II)

in which
$R^1$ and $R^2 = C_{1-12}$ alkyl,
$R^3$, $R^4 = C_{1-18}$ alkyl,

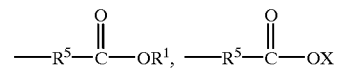

$R^5 = -(CH_2)-_n$, $-CH=CH-$, $-CH=CR^1-$,
X=H, 1 equivalent of an alkali metal, preferably Na or K, ½ equivalent of an alkaline earth metal, preferably Mg or Ca,
n=2–8.

15 Claims, No Drawings

GLASS-FIBER-REINFORCED THERMOPLASTIC ABS COMPOSITIONS

CROSS-REFERENCE TO RELATED APPLICATIONS

This application is a continuation-in-part of application Ser. No. 08/771,374, filed on Dec. 16, 1996, now abandoned which was a continuation of application Ser. No. 07/918,970, filed on Jul. 24, 1992, now abandoned.

This invention relates to glass-fiber-reinforced thermoplastic ABS compositions containing special additives for improving the coupling between polymer and glass fibers.

Blends of graft polymers of resin-forming monomers on rubbers, thermoplastic polymers (resins) and fillers are known (H. G. Elias, "Makromoleküle", Hüthig & Wepf Verlag Basel/Heidelberg/New York 1981, pages 994 et seq.) because the strength and rigidity of non-reinforced plastics are unsatisfactory for numerous applications. Most of these disadvantages can be overcome by incorporation of reinforcing materials. Thus, glass fibers of modified minerals, for example, are added to the plastics.

To reinforce plastics with glass fibers, a suitable size normally has first to be applied to the glass fibers, more particularly to low-alkali glass fibers, to promote firm adhesion between the plastic matrix and the reinforcing material. In practice, the glass fibers are finished with a spinning size. For the production of glass filaments, the size mainly contains binders in the form of an aqueous dispersion for bunching the many individual fibers together and also suitable coupling agents (for example trimethoxyaminopropyl silane) which are intended to guarantee better adhesion between filler and polymer matrix and also effective incorporation of the fillers. In addition, the size may contain auxiliaries for the processing of the filaments in subsequent process steps (see K. L. Löwenstein, "The Manufacturing Technology of Continuous Glass Fibres", Elsevier Scientific Publishing Company, Amsterdam/London/New York, 1973, pages 191–233).

In most cases, reinforcement with glass fibers leads to only a partial improvement in the properties. Whereas rigidity and strength are generally increased to a considerable extent, elasticity and particularly impact strength are often clearly reduced. To achieve effective reinforcement with a minimal loss of toughness, firm adhesion or coupling must exist between the matrix and the glass fibers.

Japanese patent application 56/095 953 describes glass-fiber-reinforced thermoplastic molding compositions consisting of glass-fiber-containing polymer pellets and glass-fiber-free thermoplastic resins. The glass-fiber-containing polymer pellets are produced by polymerization of styrene/acrylonitrile in the presence of soluble, i.e. uncrosslinked, acid-functional acrylate rubber and glass fibers in suspension and subsequent drying. In this process (suspension polymerization and drying in the presence of glass fibers), which is difficult to control on an industrial scale, the glass fibers are not firmly phasecoupled to the thermoplastic matrix.

DE-OS 3 436 602 describes glass-fiber-reinforced thermoplastic resin compounds consisting of a polymer resin A) of an aromatic vinyl monomer (styrene), unsaturated nitrile (acrylonitrile) and methacrylates, a polymer resin B) of maleic imides, aromatic vinyl compounds (styrene) and vinyl monomers (acrylonitrile) and a polymer resin C) of aromatic vinyl monomers (styrene) and unsaturated nitrile monomers (acrylonitrile) and a graft rubber D). A) is prepared in the presence of the glass fibers by suspension polymerization. The mixture has particularly high heat resistance. It is evident from its physical properties that the coupling of the glass fibers to the resin is inadequate.

According to Australian patent 86 60580, high-impact resins are obtained from copolymers of aromatic vinyl compounds and unsaturated nitrile containing less than 15% by weight rubber providing the rubber is added in the form of a graft polymer of a rubber core and a graft shell of aromatic vinyl compounds, vinyl cyanides and methacrylic acid derivatives. These blends may also contain glass fibers.

These reinforced plastics do not perform satisfactorily under multiaxial load so that they cannot be used for making, for example, housing parts which are exposed to impact stress.

EP-A 303 919 describes a glass-fiber-containing molding composition of A) a copolymer of an aromatic vinyl compound and acrylonitrile or methacrylonitrile and B) a special terpolymer of an aromatic vinyl compound, acrylonitrile (or methacrylonitrile) or methyl acrylate (or methyl methacrylate) and tert. butyl acrylate or methacrylate, which may additionally contain a graft rubber. However, a monomer which is not available on an industrial scale is required for the production of these molding compositions.

Accordingly, there is a need for glass-fiber-containing thermoplastic ABS compositions which are based on conventionally produced ABS molding compositions successfully used in non-reinforced form, but which show firm adhesion or phase coupling between the plastic matrix and the glass fibers and, hence, improved properties.

The present invention relates to glass-fiber-reinforced thermoplastic ABS compositions containing up to 5% by weight (preferred ranges include 0.5 to 5%, 1 to 5% and 0.5 to 2% by weight) of a special tin-containing organic compound.

In a preferred embodiment, the invention relates to thermoplastic ABS compositions of:

35 to 89% by weight and preferably 40 to 85% by weight of a mixture of
A) a graft polymer of resin-forming monomers on a rubber,
B) a thermoplastic resin and
C) 0.1 to 5% by weight and, more particularly, 0.25 to 4% by weight of a tin-containing organic compound corresponding to formula (I) and/or (II)

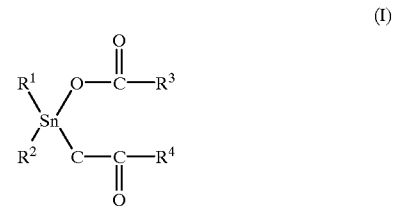

(I)

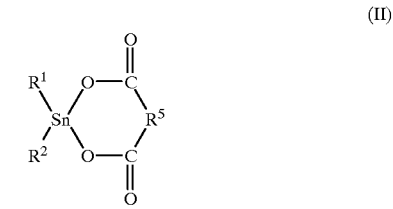

(II)

in which
$R^1$ and $R^2 = C_{1-12}$ alkyl,
$R^3$, $R^4 = C_{1-18}$ alkyl,

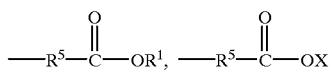

$R^5 = -(CH_2)-_n, -CH=CH-, -CH=CR^1-,$

X=H, 1 equivalent of an alkali metal, preferably Na or K, ½ equivalent of an alkaline earth metal, preferably Mg or Ca, n=2–8, and D) 10 to 60% by weight, preferably 10 to 50% by weight, more preferably 12 to 40% by weight and, most preferably, 12 to 25% by weight glass fibers.

The thermoplastic compositions according to the invention show improved adhesion between the plastic and the glass fibers and exhibit improved technological properties, such as increased toughness coupled with very good processability and high heat resistance.

In one particular embodiment, mixture of A) and B) according to the invention are mixtures of A-a) 5 to 70% by weight of one or more graft polymers and B)-a) 95 to 30% by weight of one or more thermoplastic resins.

Graft products (A-a) are preferably polymers obtained by polymerization of resin-forming monomers in the presence of a rubber as graft base. The percentage rubber content is between 5 and 80% by weight and is determined inter alia by the polymerization process.

Particularly suitable rubbers (graft base) are butadiene, butadiene/acrylonitrile and butadiene/styrene polymers and also butadiene/styrene block polymers. Other suitable rubbers are acrylate polymers, acrylate/vinyl ether copolymers and EPDM terpolymers. Resin-forming monomers are mainly styrene, mixtures of styrene and acrylonitrile, preferably in a ratio by weight of 90:10 to 60:40, mixtures of styrene and methyl methacrylate, preferably in a ratio by weight of 5:95 to 95:5, and styrene/acrylonitrile/methyl methacrylate mixtures.

The production of the graft polymers is known:

The resin-forming monomers (graft monomers) may be polymerized in the presence of a latex of the rubber (graft base) in emulsion using radical initiators, the average particle diameter of the rubber latex particles generally being from 0.04 to 0.8 μm and preferably from 0.05 to 0.6 μm. If the graft base is partly crosslinked and providing certain graft monomer/graft base ratios are maintained, the particle size of the latex of the graft base also determines the particle size of the graft polymer. The graft shell of chains of the polymer of the graft monomers attached chemically to the rubber particles is relatively thin and does not significantly alter the diameter of the rubber particle. "Diameter" or "particle size" is the mean diameter $d_{50}$, i.e. the diameter above which the diameters of 50% by weight of the particles and below which the diameters of 50% by weight of the particles lie. The grafting reaction is generally incomplete. In addition to the actual graft polymer, the non-grafted copolymer of the graft monomers is also formed. Accordingly, the product of the grafting reaction is also known as the "graft product".

Graft products can also be produced by bulk solution or bulk suspension polymerization starting from a rubber soluble in the monomers.

In this case, the size of the graft rubber particles is determined by the phase inversion and may be varied both mechanically by stirring and also by chemically influencing the phase equilibrium (addition of dispersants). Particles having average diameters of ≧1μ are generally obtained in this way. The graft product obtained by solution or bulk polymerization contains at most about 25% by weight rubber.

According to the invention, it is possible to use graft products of which the particles have a diameter of 0.05 to 20μ. A considerable percentage of the graft monomers may be included inside the rubber particle in the form of homopolymer or copolymer. Particle diameters of 0.05 to 1.2μ are preferred, particle diameters of 0.05 to 0.6μ being particularly preferred. It is also possible to use several different graft products alongside one another, for example two graft products which differ in their degree of grafting or graft density, the size of the rubber particles and/or the graft density. The degree of grafting is understood to be the quantity of polymer grafted on, based on the total quantity of rubber base, while the graft density is understood to be the number of polymer chains grafted on, based on the total surface area of the rubber base. For example, a mixture of a graft product of rubber particles having a mean particle diameter of 0.35 to 10μ and a graft product of rubber particles having a mean particle diameter $d_{50}$ of 0.05 to 0.32μ is particularly suitable.

The graft products preferably contain 30 to 80% by weight (more particularly 40 to 75% by weight) rubber, have a mean particle diameter of 0.1 to 0.5μ and are used in such a quantity that the ABS molding compound contains from 5 to 25% by weight and preferably from 5 to 20% by weight rubber (graft base).

The thermoplastic resin which forms the second component of the thermoplastic ABS composition (B-a) forms the continuous phase (matrix) and is a polymer or copolymer of styrene, α-methyl styrene, acrylontrile and methyl methacrylate, Polystyrene, styrene/acrylontrile copolymers containing 20 to 35% by weight acrylonitrile and α-methyl styrene/acrylonitrile copolymers containing 20 to 31% by weight acrylonitrile are preferred. The weight average molecular weight of these resins is in the range from 50,000 to 550,000 for a molecular non-uniformity of $$U_n = \frac{\overline{M}_w}{\overline{M}_n} - 1 = 1.0 \text{ to } 3.5$$

If only one graft product is used to produce the moulding compounds, it is of advantage if the quantitative compositions of the graft monomers and the resin-forming monomers largely correspond. If two graft products are used, it is of advantage if the quantitative ratio of the styrene and acrylonitrile components in the polymer of the graft shell of the coarser-particle graft component differs from that of the resin.

The styrene or α-methyl styrene/acrylonitrile copolymers may be produced by known methods, for example by bulk polymerization, solution polymerization, suspension polymerization and emulsion polymerization.

The graft product and the thermoplastic resin are often separately prepared. In general, they are both produced by emulsion polymerization. If they are both formed as a latex, the latices may be mixed and co-precipitated.

Tin-containing organic compounds C) in the context of the invention are those having structures corresponding to formulae (I) and/or (II)

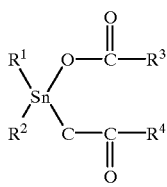

(I)

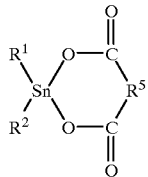

(II)

in which
R$^1$ and R$^2$=C$_{1-12}$ alkyl,
R$^3$, R$^4$=C$_{1-18}$ alkyl,

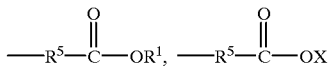

R$^5$=—(CH$_2$)—$_n$, —CH=CH—, —CH=CR$^1$—,
X=H, 1 equivalent of an alkali metal, preferably Na or K,
½ equivalent of an alkaline earth metal, preferably Mg or Ca,
n=2–8.

Examples of such compounds are dibutyl tin butyrate, dibutyl tin octoate, dibutyl tin maleate, dioctyl tin butyrate, dioctyl tin octoate, dioctyl tin maleate. Dibutyl tin maleate and dioctyl tin maleate are preferred.

These tin-containing organic compounds are known and are normally used as stabilizers for PVC (cf. H. Andreas in Gächter/Müller: Kunststoff-Additive, Carl Hanser Verlag, München/Wien, 1979, page 162 and the literature cited therein).

Low-alkali glass fibers are preferably used as the glass fibers D). The glass fibers are sized and generally have an average length of 8 to 15 mm and a diameter of 0.05 to 0.5 mm. Glass fibers having different lengths or diameters may also be used.

In addition, the molding compounds according to the invention may also contain the usual additives, such as dyes, pigments, stabilizers, flameproofing additives, nucleating agents, lubricants and mold release agents.

The compositions according to the invention may be produced by any of the methods normally used for producing reinforced thermoplastics. The glass fibers D) may be incorporated in the ABS molding compound in kneaders, on rolls or in single-screw or multiple-screw extruders at temperatures above 200° C. by initially introducing the molding compounds of A) and B) and incorporating the additive C) or vice versa and adding the glass fibers D) to the homogenized melt. It is also possible to mix all three components A), B) and C) and then to add D) to the melt. The quantity in which the additives are used is gauged in such a way that they are able to develop the desired effect in the blend. The optimal quantity may readily be determined by preliminary tests.

The thermoplastic compositions according to the invention are distinguished by improved coupling of the plastic matrix to the glass fibers and hence by improved toughness. They may be converted into molded articles of any kind by any of the methods normally used for thermoplastic processing, for example injection molding or extrusion. Examples of such molded articles are instrument panels and rear light housings for motor vehicles.

EXAMPLES

Examples 1 to 3

Production of Compositions According to the Invention

16 Parts by weight of a graft polymer produced by emulsion polymerization of 36 parts by weight styrene and 14 parts by weight acrylonitrile in the presence of 50 parts by weight of a polybutadiene present in latex form having a mean particle diameter (d$_{50}$) of 112 nm, 16 parts by weight of a graft polymer produced by emulsion polymerization of 36 parts by weight styrene and 14 parts by weight acrylonitrile in the presence of 50 parts by weight of a polybutadiene present in latex form with a mean particle diameter (d$_{50}$) of 400 nm, 68 parts by weight of a styrene/acrylonitrile (72:28) copolymer having an average molecular weight $\overline{M}_w$ or approx. 115,000 ($\overline{M}_w/\overline{M}_n-1\approx 2$), 0.5 part by weight magnesium stearate and the parts by weight of dibutyl tin maleate shown in Table 1 were mixed in the melt in an internal mixer, after which 20 parts by weight glass fibers (Glasfaser CS 7911®, a product of Bayer AG) were added and thoroughly mixed with the melt.

The resulting material was granulated and converted into test specimens by injection molding at 240° C. The data measured on the test specimens are shown in Table 1.

Examples 4 and 5

Production of Compositions According to the Invention

The molding compounds described in Examples 1 to 3 were produced using the quantities of dioctyl tin maleate shown in Table 1 instead of dibutyl tin maleate. All the other components and quantities were the same. The resulting data are also shown in Table 1.

Example 6

Comparison

The procedure was the same as in Example 1 except that no dibutyl tin maleate was added. All of the other components and quantities were the same. The resulting data are shown in Table 1.

In Examples 1–6, each of the graft polymers that were used in the compositions contained 1.2 parts by weight (based on 100 parts by weight of the graft polymer) of a stabilizer against oxidative and thermal degradation (i.e., antioxidants). In other words, each of the graft polymers contained 1.2% by weight of the stabilizer. The stabilizer was a mixture of Vulkanox KB (Ionol), Vulkanox ZKF (Bayer AG) and Irganox PS 800 (Ciba Geigy) in the weight ratio of 4:1:7. With respect to the overall composition of each of Examples 1 to 6, this means that each of the compositions contained 0.38 parts by weight of the stabilizer (referred to in Table 1 as the "antioxidants").

Example 7

Comparison

The procedure was the same as in Example 1 except that no dibutyl tin maleate and no glass fibers were added. All of the other components and quantities were the same. The resulting data are shown in Table 1.

Example 8

Comparison

The procedure was the same as in Example 1 except that 2 parts by weight of dibutyl tin maleate was used rather than 0.5 parts by weight and no glass fibers were added. All of the other components and quantities were the same. The resulting data are shown in Table 1.

As in Examples 1–6, each of the graft polymers that were used in the compositions of Examples 7 and 8 contained 1.2 parts by weight (based on 100 parts by weight of the graft polymer) of a stabilizer against oxidative and thermal degradation (i.e., antioxidants). In other words, each of the graft polymers contained 1.2% by weight of the stabilizer. The stabilizer was a mixture of Vulkanox KB (Ionol), Vulkanox ZKF (Bayer AG) and Irganox PS 800 (Ciba Geigy) in the weight ratio of 4:1:7. With respect to the overall composition of each of Examples 7 and 8, this means that each of the compositions contained 0.38 parts by weight of the stabilizer (referred to in Table 1 as the "antioxidants").

For the data shown in Table 1, impact strength was measured at room temperature ($a_n^{RT}$) in accordance with ISO 180/1A (unit: $kJ/m^2$) as was notched impact strength ($a_k^{RT}$). Ball indentation hardness ($H_c$) was determined in accordance with DIN 53 456 (unit: $N/mm^2$) and Vicat B heat resistance (softening temperature) was measured in accordance with DIN 53 460 (unit: °C.).

Thermoplastic flow was evaluated by measurement of the necessary filling pressure at 240° C. (unit: bar), cf. F. Johnnaber, Kunststoffe 74 (1984), 1, pages 2–5, and measurement of the MVI value in accordance with DIN 53 735 U (unit: $cm^3/10$ mins.). As would be known by one skilled in the art, the filling pressure is the pressure required to fill a mould. Therefore, the filling pressure is a measure of the processability of the composition. The higher the filling pressure, the worse is the processability of the composition and the lower is the MVI value. In other words, the higher the filling pressure, the lower the MVI value.

It can be seen from the described tests and the resulting data shown in Table 1 that the reinforced molding compounds according to the invention show the most favorable overall property level, more particularly accommodation of high toughness, high heat resistance and very good processability.

As shown by the data in Table 1, the addition of tin containing organic compounds to the compositions that contain glass fibers results in a remarkable improvement in the impact strength and notched impact strength of the samples produced from those compositions. In contrast, the addition of the tin containing organic compounds to the compositions that do not contain glass fibers (but are identical in every other way to the compositions according to the examples of the invention) actually results in a decrease in the impact strength and notched impact strength of the samples produced from those compositions.

TABLE 1

(Test data of the compositions of the Examples)

| Ex. | Glass Fibers (pbw) | Anti- oxidants* (pbw) | Tin containing organic compound (pbw) | Quant. of tin containing organic compound (pbw) | $a_n^{RT}$ | $a_k^{RT}$ | $H_c$ | Vicat B | Filling Pressure | MVI |
|---|---|---|---|---|---|---|---|---|---|---|
| 1 | 20 | 0.38 | dbtm | 0.5 | 19 | 8.3 | 116 | 106 | 151 | 13 |
| 2 | 20 | 0.38 | dbtm | 2 | 19 | 8.3 | 115 | 107 | 143 | 14 |
| 3 | 20 | 0.38 | dbtm | 5 | 20 | 7.6 | 116 | 103 | 152 | 17 |
| 4 | 20 | 0.38 | dotm | 1 | 22 | 9.1 | 116 | 108 | 149 | 15 |
| 5 | 20 | 0.38 | dotm | 2 | 19 | 8.5 | 117 | 107 | 144 | 15 |
| 6 | 20 | 0.38 | — | — | 14 | 5.4 | 113 | 105 | 156 | 13 |
| 7 | — | 0.38 | — | — | 72 | 8.1 | 106 | 106 | 165 | 9 |
| 8 | — | 0.38 | dbtm | 2 | 60 | 5.6 | 108 | 104 | 142 | 8 |

*antioxidants: mixture of Vulkanox KB (Ionol), Vulkanox ZKF (Bayer AG) and Irganox PS 800 (Ciba Geigy) in the weight ratio 4:1:7
dbtm = dibutyl tin maleate
dotm = dioctyl tin maleate
pbw = parts by weight

What is claimed is:
1. Glass fiber-reinforced thermoplastic composition consisting essentially of 35 to 89% by weight of a mixture of
   A) grafted rubber, and
   B) thermoplastic resin consisting essentially of either polystyrene or a copolymer of styrene and/or α-methyl styrene and acrylonitrile,
   C) 0.1 to 5% by weight of a tin-containing organic compound corresponding to formula (I) and/or (II)

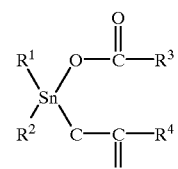

(I)

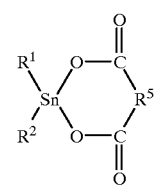

(II)

in which
$R^1$ and $R^2 = C_{1-12}$ alkyl,
$R^3$, $R^4 = C_{1-18}$ alkyl,

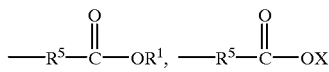

$R^5 = -(CH_2)-_n$, $-CH=CH-$, or $-CH=CR^1-$,

X=H, 1 equivalent of an alkali metal, or ½ equivalent of an alkaline earth metal, and n=2–8, and D) 10 to 60% by weight glass fibers.

2. Glass fiber-reinforced thermoplastic compositions as claimed in claim 1, containing 5 to 70% by weight A) and 95 to 30% by weight B) in the form of a blend of A) and B).

3. Glass fiber-reinforced thermoplastic compositions as claimed in claim 1, in which A) is a graft polymer of styrene and acrylonitrile on polybutadiene and B) is a copolymer of styrene and/or α-methyl styrene and acrylonitrile.

4. Glass fiber-reinforced thermoplastic compositions as claimed in claim 1, in which D) consists of glass fibers 8 to 15 mm in length.

5. Glass fiber-reinforced thermoplastic compositions according to claim 1, wherein said compositions contain from 0.5 to 5% by weight of said tin-containing organic compound.

6. Glass fiber-reinforced thermoplastic compositions according to claim 1, wherein said compositions contain from 0.25 to 4% by weight of said tin-containing organic compound.

7. Glass fiber-reinforced thermoplastic compositions according to claim 1, wherein said compositions contain from 1 to 5% by weight of said tin-containing organic compound.

8. Glass fiber-reinforced thermoplastic compositions according to claim 1, wherein said compositions contain from 2 to 5% by weight of said tin-containing organic compound.

9. Glass fiber-reinforced thermoplastic composition as claimed in claim 5, wherein said mixture of A) and B) contains 5 to 70% by weight A) and 95 to 30% by weight B).

10. Glass fiber-reinforced thermoplastic composition as claimed in claim 7, wherein said mixture of A) and B) contains 5 to 70% by weight A) and 95 to 30% by weight B).

11. Glass fiber-reinforced thermoplastic composition as claimed in claim 5, in which A) is a graft polymer of styrene and acrylonitrile on polybutadiene, and B) is a copolymer of styrene and/or α-methyl styrene and acrylonitrile.

12. Glass fiber-reinforced thermoplastic composition as claimed in claim 7, in which A) is a graft polymer of styrene and acrylonitrile on polybutadiene, and B) is a copolymer of styrene and/or α-methyl styrene and acrylonitrile.

13. Glass fiber-reinforced thermoplastic compositions according to claim 1, wherein said compositions contain from 0.5 to 2% by weight of said tin-containing organic compound.

14. Glass fiber-reinforced thermoplastic compositions according to claim 3, wherein said compositions contain from 0.5 to 2% by weight of said tin-containing organic compound.

15. Glass fiber-reinforced thermoplastic composition consisting essentially of 35 to 89% by weight of a mixture of A) grafted rubber, and B) thermoplastic resin consisting essentially of either polystyrene or a copolymer of styrene and/or α-methyl styrene and acrylonitrile, C) 0.1 to 5% by weight of a tin-containing organic compound corresponding to formula (I) and/or (II)

(I)

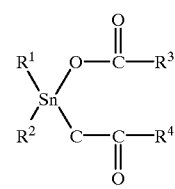

(II)

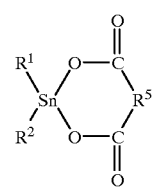

in which $R^1$ and $R^2 = C_{1-12}$ alkyl, $R^3$, $R^4 = C_{1-18}$ alkyl,

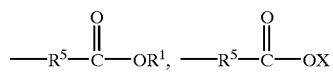

$R^5 = -(CH_2)-_n$, $-CH=CH-$, or $-CH=CR^1-$,

X=H, 1 equivalent of an alkali metal, or ½ equivalent of an alkaline earth metal, and n=2–8, D) 10 to 60% by weight glass fibers, and E) an additive selected from the group consisting of dyes, pigments, stabilizers, nucleating agents, lubricants and mold release agents.

* * * * *